United States Patent [19]

House

[11] Patent Number: 4,812,123
[45] Date of Patent: Mar. 14, 1989

[54] EDUCATIONAL DEVICE AND GAME

[76] Inventor: Roy D. House, Rte. 1, Stark City, Mo. 64866

[21] Appl. No.: 74,234

[22] Filed: Jul. 16, 1987

[51] Int. Cl.$^4$ .......................... G09B 1/00; G09B 19/02
[52] U.S. Cl. ..................................... 434/195; 434/207
[58] Field of Search ............... 434/195, 196, 205, 207, 434/333, 403, 407, 172, 170

[56] References Cited

U.S. PATENT DOCUMENTS

| | | | |
|---|---|---|---|
| 971,185 | 9/1910 | Freeman | 434/195 |
| 1,594,376 | 8/1926 | Passmore | 434/195 |
| 1,950,072 | 3/1934 | Townsend | 434/195 |
| 3,229,388 | 1/1966 | Smith | 434/195 |
| 3,303,580 | 2/1967 | Stinar | 434/205 X |
| 3,410,002 | 11/1968 | Mulholland et al. | 434/195 |
| 3,935,649 | 2/1976 | Harte | 434/195 |
| 4,560,354 | 12/1985 | Fowler | 434/209 X |
| 4,613,309 | 9/1986 | McCloskey | 434/170 |

FOREIGN PATENT DOCUMENTS

| | | | |
|---|---|---|---|
| 692296 | 7/1965 | Italy | 434/195 |
| 63964 | 3/1949 | Netherlands | 434/205 |

Primary Examiner—Samuel Scott
Assistant Examiner—Carl D. Price
Attorney, Agent, or Firm—Edward L. Bowman

[57] ABSTRACT

An educational device useful for teaching numbers, addition, subtraction, reading, and logic comprising a flat playing surface having rows of equally dimensioned boxes, ascending numerical indicia associated with the boxes in each horizontal row, blocks of varying dimensions having numbers thereon proportional to their relative horizontal dimensions and being adapted to fit in each row in such a way that the number appearing to the right of the block or block will indicate how may boxes are covered by the block or blocks in that row. In a preferred embodiment there is also provided a set of card containing a numbered card corresponding to each numbered block.

11 Claims, 4 Drawing Sheets

EDUCATIONAL DEVICE AND GAME

FIELD OF THE INVENTION

This invention is directed to an educational device. More specifically this invention is concerned with an educational devie and game which can be useful in teaching numbers, addition, subtraction, reading, and the like. The device is also useful for developing manual deterity and for developing an awareness of spacial relationships, especially in preschool age children.

BACKGROUND OF THE INVENTION

A number of devices have been developed in the past as aids for teaching the concepts of numbers, addition, subraction, and reading. To be of most significant benefit a device of this type must be simple enough for the age bracket for which it is intended and at the same time it must keep the attention of the student. It is further desirable for the device to challenge but not frustrate the learning student.

It is an object of this invention to provide an educational device which is simple and yet can keep the attention of the student. Other objects, advantages, and features of the invention will become apparent to those skilled in the art after reading the following description, taken in conjunction with the accompanying drawings.

SUMMARY OF THE INVENTION

In accordance with the present invention there is provided and educational device comprising a generally flat playing surface having inscribed thereon a plurality of uniformly spaced horizontal and vertical indicia lines resulting in a plurality of rows of boxes of equal horizontal dimension. Each box to the left of the left-most box in each row contains a numerical indicia. The numerical indicia increase in numerical order from left to right in each said row. The device further comprises a plurality of blocks having different horizontal dimensions which horizontal dimensions are equal to the horizontal dimensions of one or more of the boxes of each row. Each of the blocks has a numerical indicia inscribed on the front surface thereof corresponding to the number that would appear in the box immediately to the right of the block when the block is placed in one of the rows with the left side of the block aligned with the left side of the left-most box of the row.

DETAILED DESCRIPTION

The actual form of the present invention can vary in many ways. Preferred embodiments are illustrated by the Figures and Photos provided with this application.

Figure 1:
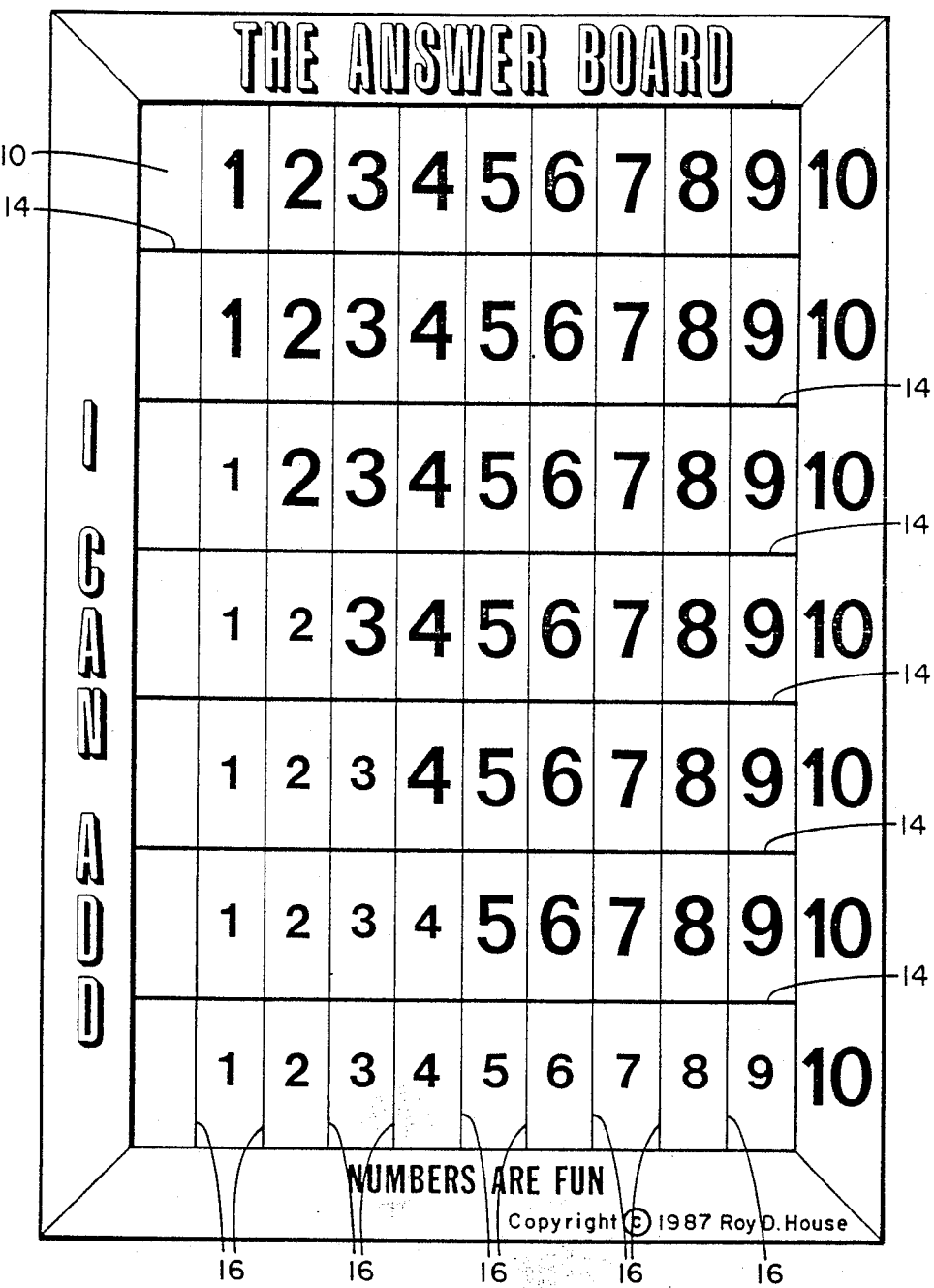
FIG. 1 is a top plan view of a preferred embodiment of the playing board with all the blocks removed therefrom.

FIG. 1 illustrates a portion of an inventive device comprising a generally flat playing surface 10 secured to a frame 12. The playing surface 10 has inscribed on its upper surface a plurality of uniformly spaced apart horizontal line indicia 14 and a plurality of uniformly spaced apart vertical line indicia 16 which together provide seven rows each of which contains 10 boxes. Each box to the left of the left-most box in each row has inscribed therein a numberical indicia which increases from 1 to 9 in numerical order from left to right. To the right of each row of boxes the numerical indicia 10 is inscribed on the frame 12.

In the preferred embodiment illustrated it will be noted that there are two different type size numerical indicia in the boxes. The first numerical indicia in the third row from the top is of a smaller type than all the above numerical indicia or all the rest of the numerical indicia in that line. In the fourth row from the top the first two numerical indicia are of the smaller type. In the fifth row the first three numerical indicia are of the smaller type. In the sixth row the first 4 are of the smaller type and in the final row all of the numerical indicia in the boxes are of the smaller type. The advantages and benefits of such an arrangement will be discussed in more detail below.

Figure 2:
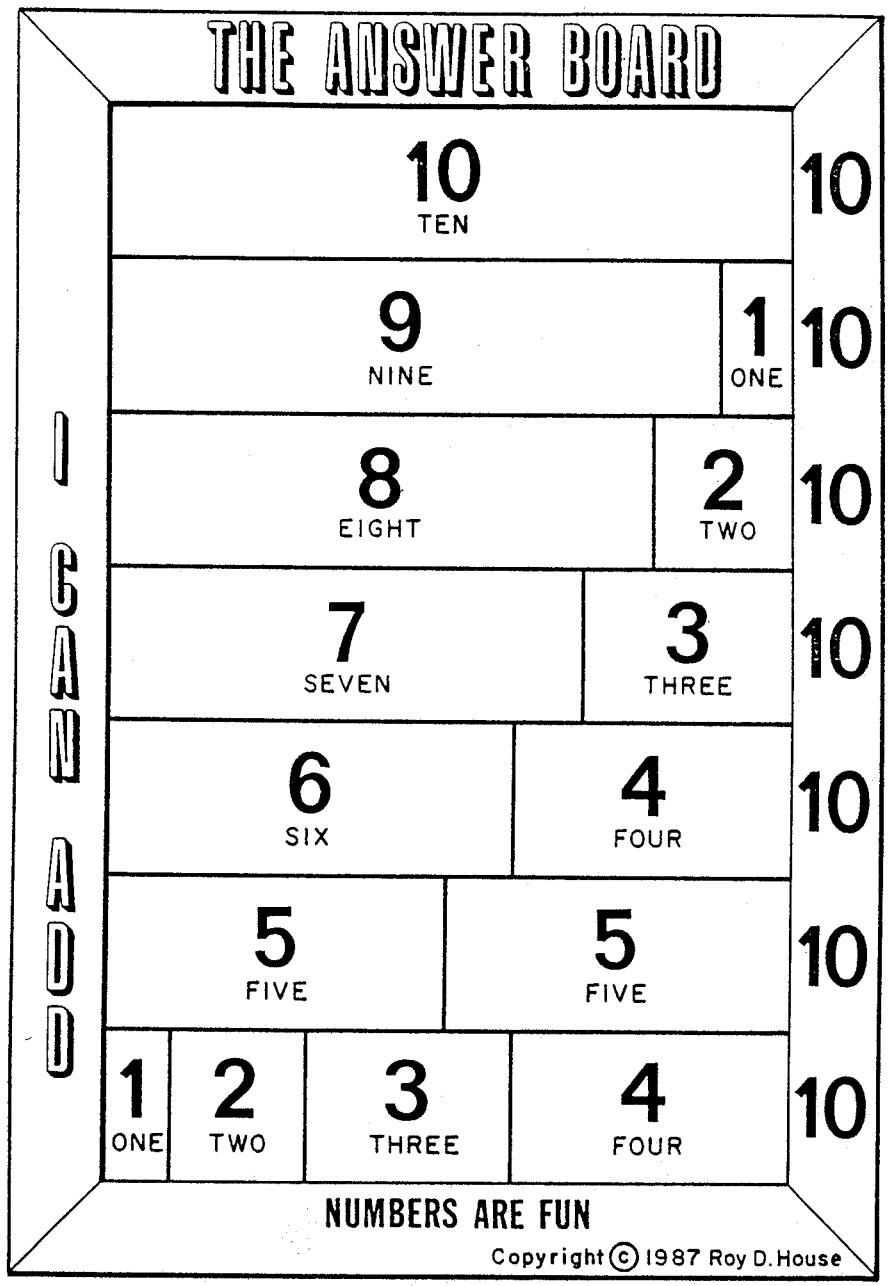
FIG. 2 is a top plan view of the playing board of FIG. 1 with all the blocks arranged upon the surface of the playing board.

FIG. 2 illustrates the playing board of FIG. 1 with a plurality of blocks in place on the playing board. As illustrated there are 15 blocks. Each block is of such size that it can fit between the upper and lower horizontal lines of any row of the boxes on the playing board. The blocks each have inscribed thereon a numerical indicia corresponding to the number that would appear in the box immediately to the right of the block if the left side of the block were aligned with the left side of the left-most box of a row. The blocks also contain alphabetic indicia spelling out the word for the number on that block.

Figure 3:
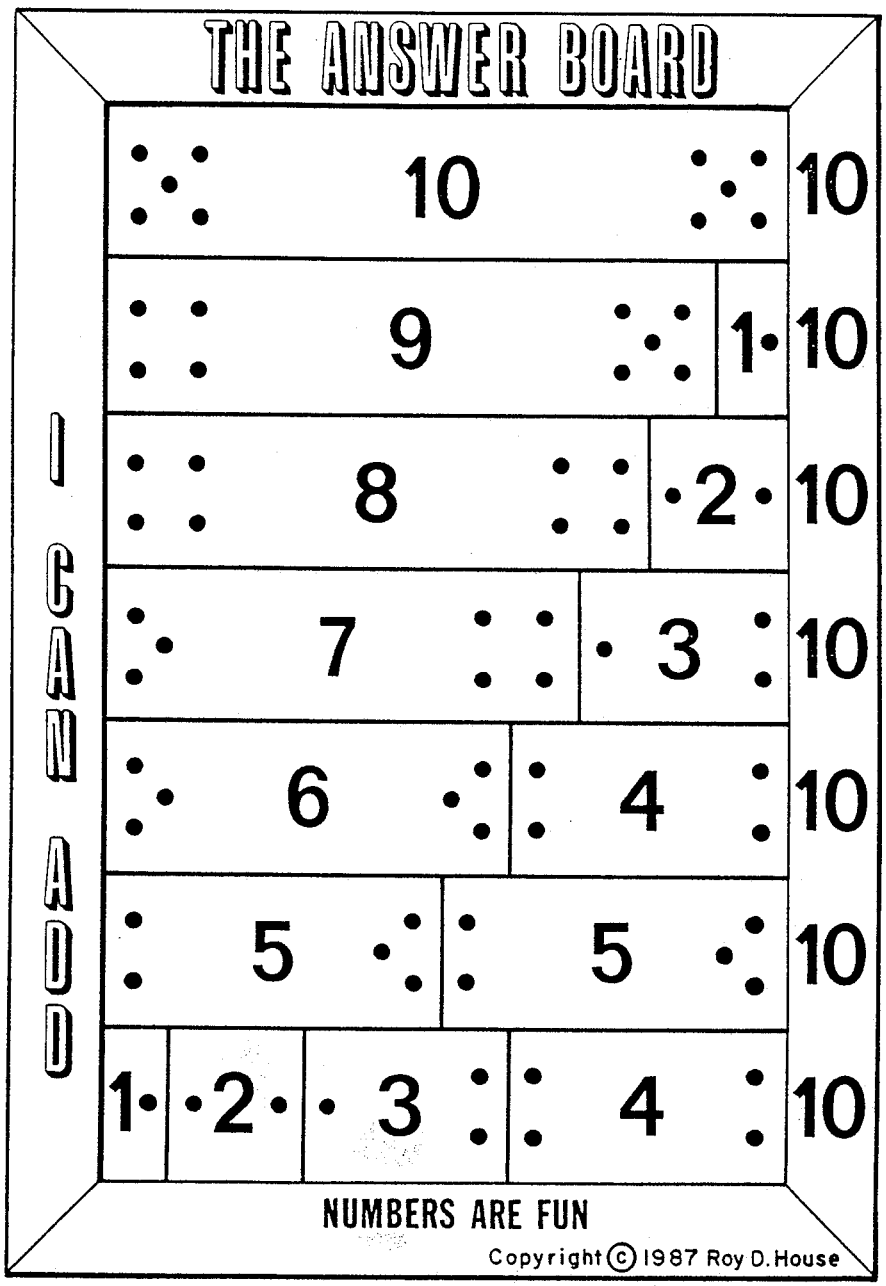
FIG. 3 is a top plan view of the playing board of FIG. 1 with all the blocks shown in FIG. 2 still arranged upon the surface of the playing board but turned over 180 degrees so that the other surface of the blocks is showing.

FIG. 3 illustrates the playing board of FIG. 1 with the blocks of FIG. 2 in place but turned over so that the opposite surface of the blocks is shown. It will be noted that the opposite surfaces of the blocks also contain the same numerial indicia that was on the opposite surface of the block. Each of the blocks further has one or more dot indicia inscribed on that surface, the number of which is equal to the value of that block's numerical indicia.

Figure 4:
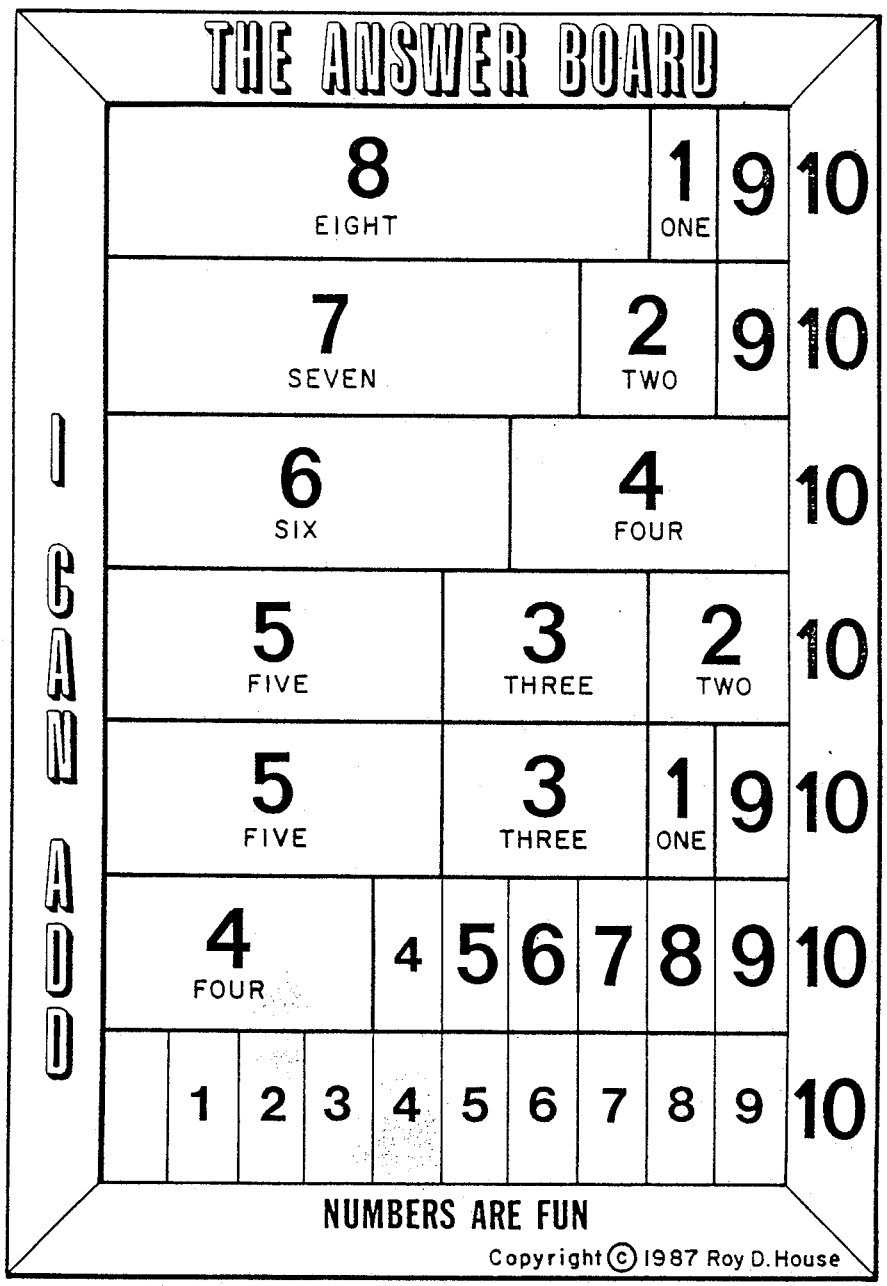
FIG. 4 is a top plan view of the playing board with only a few of the blocks positioned thereon to illustrate how the board can teach a student about numbers and more specifically about addition.

FIG. 4 illustrates how the blocks can be used in combination with with playing board to teach addition or subtraction. Note that the first row from the top edge contains blocks having the numerical indicia 8 and 1 respectively. To the right of the blocks appears the numerical indicia 9 in a box, i.e. the value for the sum of 8 and 1. The board is thus capable of revealing the value corresponding to the sum of the values shown on the blocks in that row. For that reason the inventor generally refers to the invention as "The Answer Board".

Referring further to FIG. 4 it will be noted that the second row from the top contains the blocks having the numerical indicia 7 and 2. To the right of those blocks appears the sum of 7 plus 2. The third row from the top contains blocks having the numerical indicia 6 and 4. To the right of the blocks on the frame of the board is the numerical indicia 10, the sum of 6 plus 4. The fourth row from the top contains blocks numbered 5,3, and 2. To the right of those blocks on the frame there is the number 10 indicating that the sum of 5 plus 3 plus 2 is 10. The fifth row contains the blocks numbered 5,3, and 1. To the right of the blocks appears the number 9, the sum of 5 plus 3 plus 1. In the sixth row from the top there appears a numerical indicia 4.

From what has been described thus far it should be clear that the playing board can be used to teach addition of combination of numbers because when two or more block are placed in a row the sum will be the next number to the right. To teach subtraction the reverse technique is employed, for example in the top row of FIG. 4 it can be shown that if you take away the block containing numerical indicia 1 from that row the answer becomes 8. Thus 9 take away (or minus) 1 equals 8.

For a child just learning arabic numerals the dots can be used to allow the child to identify the arabic numeral symbol with the corresponding number of individual entities, i.e. dots.

The other side of the blocks containing the numeric and alphabetic indicia allow the child to learn to associate the arabic numeral with the word for that numeral.

The relevance of the numerals of smaller type will now be explained. If a student is given the task of finding all the combinations of the available blocks which are equal to a given number he can arrange the blocks from the top to bottom in each row and when he has found all the combinations the large type box numbers of that value will not be present in the next row.

In a particularly preferred embodiment of the invention there is also provided a set of cards corresponding in number to the number of blocks provided with the playing surface. Each such card corresponding to a particular block has the nmerical indicia of that block inscribed thereon. Thus for an inventive device of the type illustrated in FIGS. 1–4, there would be 15 cards with one each having the numerical indicia 6,7,8,9, and 10 and two each having the numerical indicia 1,2,3,4, and 5, respectively. The cards preferably all have the same dimensions. The cards could be of the same size as regular playing cards, but most preferably are of a width equal to the distance between the horizontal lines of the playing surface.

The cards can be used in conjunction with the playing board in several ways. For example, when there are two players the 10 card can be removed and the remaining cards shuffled and dealt out equally to the two players. Then each player takes a turn laying down a card with the object being to form combinations in which the numerical indicia equal 10. The first player lays a card down on the board in one of the row of blocks. The second player places a card in either that row or another. The sum of the cards in one row is not allowed to exceed 10. When a player is able to play a card which results in a row containing cards having numbers which add up to 10 that player is given a point. In a preferred embodiment of this game the person playing a card that results in a combination which totals 10 gets to take another turn, i.e. he gets to play another card. A player is also given a point for playing his last card. The game or at least one hand of the game ends when one of the players has played all his cards.

The game can also be played with 3 players by shuffling all 15 of the cards and dealing an equal number to each of the three players. The person drawing the card having the numerical indicia 10 is given a point but preferably not an extra turn and then the next player discards a card. The play then moves from player to player as described above in regard to a game with two players, points being received again by the player playing a card containing a number which when combined with the numbers of previously played cards totals to 10 and by the player playing his last card.

The card game thus has both defensive and offensive strategy since each player can hold back cards that he knows another player can use to make a combination of 10.

The game board, the blocks, and the cards can obviously be constructed out of any suitable material. The inventor currently prefers that the playing board be made of fiberboard, or the like, with a wooden frame which extends above the surface of the playing board so as to keep the blocks from sliding off the board. Most preferably the frame extends above the board a distance such that when the blocks are arranged on the board the upper surface of the blocks and the upper surface of the frame are about in the same plane. The inventor currently also prefers blocks made of wood. It should be clear, however, that the various components of the invention could be made of rubber, plastic, paperboard, paper, and/or metal, for example. In fact, in one envisioned embodiment either the blocks or the playing board have metallic character which as attracted magnetically to the other. It would also be within the scope of the invention to use velcro type materials to fashion a embodiment in which the blocks could be kept from sliding in the rows on the playing board.

It is also currently preferred by the inventor that then be at least two or more colors of blocks and that the cards containing the numeric indicia be colored the same as the block having the corresponding numeric indicia. It is noted that it is not required, but is preferable that there be enough blocks to cover all the boxes.

The inventor also considers it to be within the scope of this invention to have the playing board and the blocks displayed on a video screen via computer technology, for example. A person skilled in the art of programming computers, after having seen this disclosure, or one of the inventive devices of this disclosure could readily develop a program which would allow the user to move blocks around on a playing surface in the same fashion as is done by hand on the embodiments illustrated in the Figures attached hereto.

It should be clear that the numeric indicia could take other forms such as Roman numerals and that the words associated with the numeric indicia could be in any language.

In addition, it should also be clear that it is within the scope of this invention to have higher numbers in the rows, for example, in a device of the type illustrated in FIG. 1 the numbers could be 11 to 20 rather that 1 to 10. It is also within the scope of the invention to have more boxes per row than have been illustrated in the attached Figures. If desired therefor there could be a playing surface printed on both sides of the playing board.

The size of the blocks and the boxes can also obviously be varied over a wide range. The inventor has, however, found it quite desirable fo the blocks and the boxes to have a vertical dimension of about 2 to 3 inches and for the boxes to have a horizontal dimension of about 1 inch.

In one embodiment if the blocks are of vertical dimensions of 2 inches, it is possible to align the blocks vertically rather than horizontally. When such is done with a suitably marked playing surface it is then possible to combine the blocks to obtain even larger sums than can be obtained by aligning them from left to right horizontally. In that regard, a separate playing surface could be provided which could be placed upon the other to allow for vertical rather than horizontal addition. The separate playing surface having the box numbers increasing from top to bottom, for example. In an embodiment of that type having 15 blocks sums up to the value of 14 could thus be obtained.

It should also be noted that the inventor considers that it would be obviously equivalent to have the numbers in the boxes increase from right to left instead of from left to right as illustrated in the attached Figures; however, such an arrangement is not currently preferred since it goes against the convention used in reading most of the languages in the world today.

While the present invention has now been described in some detail in regard to particular preferred embodiments, it should be clear that there are other and further modifications apart from those shown and described herein which may be made without departing from the spirit and scope of the claimed invention and its equivalents.

What is claimed is:

1. An educational device comprising, in combination, a generally flat rectangular playing surface having a left side, a right side, a top edge, a bottom edge and a frame surrounding the playing surface, said playing surface having inscribed thereon a plurality of uniformily spaced apart horizontal indicia, extending, from the left side to the right side, and vertical line indicia, extending from the top edge to the bottom edge, which result in seven horizontal rows each containing ten boxes of equal horizontal dimension beginning at the left side of the playing surface and ending at the right side of the playing surface with each box in each row to the right of the left-most box containing a numerical indicia which increases in numerical order from left to right beginning with the number 1 and ending with the number 9, fifteen blocks having upper and lower surfaces and four edges each said block having vertical dimensions corresponding to the vertical distance between the horizontal lines of the playing surface and horizontal dimensions corresponding to the horizontal dimensions of one or more boxes, each said block having on at least one surface a numerical indicia corresponding to the number of boxes in a row of the playing surface that that particular block can exactly cover, there being two each of blocks sized to exactly cover 1,2,3,4, and 5 boxes respectively and one each of blocks sized to exactly cover 6,7,8,9 and 10 boxes respectively, wherein the numerical indicia in the boxes of the playing surface are selected from numerical indicia of first and second distinguishable print types, wherein the numerical indicia in the boxes of the first and second rows from the top edge are of the first type, and in the third row the box numerical indicia 1 is of the second type and the box numerical indicia 2-9 are of the first type, and in the fourth row the box numerical indicia 1 and 2 are of the second type and the box numerical indicia 3-9 are of the first type, and in the fifth row the box numerical indicia 1-3 are of the second type and the box numerial indicia 4-9 are of the first type, and in the sixth row the box numerical indicia 1-4 are of the second type and the box numerical indicia 5-9 are of the first type, and in the seventh row the all box numerical indicia are of the second type, and wherein there is located on the frame a numerical indicia 10 to the right of each row of boxes of the playing surface, each of said numerical indicia 10 on the frame being of the first type.

2. A device according to claim 1 wherein said first and second distinguishable types of numerical indicia are distinguishable because of size differences in the print.

3. A device according to claim 2 wherein said first distinguishable type is larger than said second distinguishable type.

4. A device according to claim 3 wherein said frame extends above the playing surface.

5. A device according to claim 4 wherein the blocks have the identical numerical indicia on both the upper and lower surface.

6. A device according to claim 5 wherein there are at least three different color blocks 7. A device according to claim 5 wherein the blocks further contain on one surface alphabetic indicia spelling out the word for the number expressed by the numerical indicia on that block.

8. A device according to claim 7 wherein the blocks still further contain, on the surface opposite the surface containing the alphabetic indicia, dot indicia consisting of the number of dots corresponding to the numerical indicia on said block.

9. A device according to claim 8 wherein each block of a different size is of a color that is different from that of all the other blocks.

10. A device according to claim 9 further comprising a set of fifteen cards each of equal dimensions including one each bearing the numerical indicia 6,7,8,9, and 10 respectively and two each bearing the numerical indicia 1,2,3,4 and 5 respectively.

11. A device according to claim 1 further comprising a set of fifteen cards each of equal dimensions including one each bearing the numerical indicia 6,7,8,9, and 10 respectively and two each bearing the numerical indicia 1,2,3,4, and 5 respectively.

* * * * *